(12) United States Patent
El-Shoubary et al.

(10) Patent No.: US 7,763,111 B2
(45) Date of Patent: Jul. 27, 2010

(54) COMPOSITIONS AND METHODS COMPRISING PIGMENTS AND POLYPROTIC DISPERSING AGENTS

(75) Inventors: Modasser El-Shoubary, Crofton, MD (US); Robert M. Hopkins, Reisterstown, MD (US); Karen L. Bowen, Pasadena, MD (US); David E. Bell, Glen Burnic, MD (US)

(73) Assignee: Millennium Inorganic Chemicals, Inc., Hunt Valley, MD (US)

( * ) Notice: Subject to any disclaimer, the term of this patent is extended or adjusted under 35 U.S.C. 154(b) by 0 days.

(21) Appl. No.: 11/778,862

(22) Filed: Jul. 17, 2007

(65) Prior Publication Data

US 2008/0035027 A1 Feb. 14, 2008

Related U.S. Application Data

(62) Division of application No. 10/996,718, filed on Nov. 24, 2004, now Pat. No. 7,261,770.

(51) Int. Cl.
*C09C 1/36* (2006.01)
*C09C 1/04* (2006.01)

(52) U.S. Cl. .................. 106/448; 106/428; 106/430; 106/436

(58) Field of Classification Search ............... 106/408, 106/428, 430, 436, 499
See application file for complete search history.

(56) References Cited

U.S. PATENT DOCUMENTS

| | | | | |
|---|---|---|---|---|
| 3,015,573 A * | 1/1962 | Myers et al. ............ | 106/448 |
| 3,477,956 A | 11/1969 | Stanford et al. | |
| 3,528,502 A | 9/1970 | Oleen | |
| 3,772,046 A * | 11/1973 | Knapp et al. ............ | 106/448 |
| 4,311,634 A * | 1/1982 | Vassiliou ................ | 524/127 |
| 4,345,945 A | 8/1982 | Robinson | |
| 4,698,099 A * | 10/1987 | Nakamura et al. ........ | 106/402 |
| 4,752,340 A * | 6/1988 | Brand et al. ............. | 106/448 |
| 4,797,163 A * | 1/1989 | Lailach et al. ........... | 106/437 |
| 4,986,851 A | 1/1991 | Dietz et al. | |
| 5,730,795 A * | 3/1998 | Herkimer ................ | 106/446 |
| 5,886,069 A | 3/1999 | Bolt | |
| 6,074,474 A | 6/2000 | Broome et al. | |
| 6,197,104 B1 | 3/2001 | Kostelnik et al. | |
| 6,342,099 B1 | 1/2002 | Hiew et al. | |
| 6,395,081 B1 | 5/2002 | Hiew et al. | |
| 6,414,074 B1 | 7/2002 | Blum | |
| 6,558,464 B2 | 5/2003 | Kostelnik et al. | |
| 6,569,920 B1 | 5/2003 | Wen et al. | |
| 6,646,037 B1 | 11/2003 | El-Shoubary et al. | |
| 6,695,906 B2 | 2/2004 | Hiew et al. | |

(Continued)

FOREIGN PATENT DOCUMENTS

WO WO 2006/057993 6/2006

*Primary Examiner*—Anthony J Green
*Assistant Examiner*—Pegah Parvini
(74) *Attorney, Agent, or Firm*—Dunlap Codding, P.C.

(57) ABSTRACT

In various embodiments, a pigment composition is provided comprising a base particle and a dispersing agent, the dispersing agent comprising a salt and/or ester of: (i) an amine, alcohol, and/or alkanol amine and (ii) a polyprotic acid, wherein the mole ratio of the amine, alcohol, and/or alkanol amine to the polyprotic acid is greater than 3:1. In various embodiments, the pigments have improved stability, hiding power, tint strength, and/or gloss.

20 Claims, 2 Drawing Sheets

Tiona 596 Dispersant Demand Comparison
Using Tamol 1124 and the new dispersant at 76.5%
TiO2 Solids

U.S. PATENT DOCUMENTS

| | | |
|---|---|---|
| 6,713,543 B2 | 3/2004 | El-Shoubary et al. |
| 6,765,041 B1 | 7/2004 | El-Shoubary et al. |
| 6,861,112 B2 | 3/2005 | Morris et al. |
| 6,911,116 B2 | 6/2005 | Farrar et al. |
| 7,091,262 B2 | 8/2006 | El-Shoubary et al. |
| 7,179,531 B2 | 2/2007 | Brown et al. |
| 7,259,195 B2 | 8/2007 | El-Shoubary et al. |
| 7,261,770 B2 | 8/2007 | El-Shoubary et al. |
| 2002/0099126 A1* | 7/2002 | El-Shoubary et al. ....... 524/447 |
| 2003/0001045 A1 | 1/2003 | Farrar et al. |
| 2004/0005406 A1 | 3/2004 | Brown et al. |
| 2004/0009763 A1 | 5/2004 | Morris et al. |

* cited by examiner

COMPOSITIONS AND METHODS COMPRISING PIGMENTS AND POLYPROTIC DISPERSING AGENTS

CROSS-REFERENCE TO RELATED APPLICATION

This application is a divisional of U.S. patent application Ser. No. 10/996,718 filed Nov. 24, 2004, the contents of which are hereby incorporated by reference in their entirety.

BACKGROUND OF THE INVENTION

Pigments are used in a wide variety of coatings such as, for example, paints, plastics, paper, laminates, corrosion resistant primers, decorative topcoats in the automotive, industrial or appliance markets. Coatings contain a mixture of solid and liquid materials that form a film when applied to a surface and the coating is allowed to cure. The solid material of a coating is a blend of pigments, fillers and resins. Typically, the pigment provides the hiding power and influences gloss and the resin forms the film when the coating is cured.

There have been significant efforts to produce pigments with desired characteristics (e.g., stability, viscosity, hiding power, tinting strength and/or gloss) for the particular application. Many prior art references describe surface treating the pigment with compounds such as for example, alumina, silica, phosphate, and/or silanes to impart the desired characteristic to the pigment for the particular end use application.

Other prior art references describe using one or more dispersing agents that may be added to a pigment or pigment slurry to obtain a coating having the above desired characteristics. These dispersing agents may be made, for example, by reacting an amine, such as for example, triethanolamine with a polyprotic acid, such as for example polycarboxylic acid. Typically, the mole ratio of amine to polyprotic acid is less than 3:1 (e.g., 1:1, 2:1, 2.5:1).

Unfortunately, some slurries made using prior art dispersing agents have reduced stability during storage because the pigment may separate out of the slurry rendering the slurry difficult to pump and transport. Upon incorporating the pigment into a suitable coating, the resultant hiding power, tinting strength and/or gloss of the coating may not be commercially acceptable.

There is a need for new pigment compositions and methods for producing commercially acceptable pigments at high throughput rates. Pigment compositions having improved stability, hiding power, tinting strength and/or gloss are also needed.

SUMMARY OF THE INVENTION

In various embodiments, compositions and methods are provided for making pigments having improved stability, hiding power, tinting strength, and/or gloss. In various embodiments, a pigment composition is provided comprising a new dispersing agent that can easily be incorporated into existing pigment production processes and made at reduced costs.

In one embodiment, a pigment is provided comprising a base particle and a dispersing agent, the dispersing agent comprising a salt and/or ester of: (i) an amine, alcohol, and/or alkanol amine and (ii) a polyprotic acid, wherein the mole ratio of the amine, alcohol, and/or alkanol amine to the polyprotic acid is greater than 3:1.

In another embodiment, a pigment slurry is provided comprising titanium dioxide and a dispersing agent, the dispersing agent comprising a salt and/or ester of: (i) an amine, alcohol, and/or alkanol amine and (ii) a polyprotic acid, wherein the mole ratio of the amine, alcohol, and/or alkanol amine to polyprotic acid is greater than 3:1.

In yet another embodiment, a method of making titanium dioxide pigment is provided comprising adding a polyprotic acid to an amine, alcohol, and/or alkanol amine in a mole ratio of greater than 1:3 to for a dispersing agent and adding titanium dioxide to the dispersing agent to make the titanium dioxide pigment.

In one exemplary embodiment, a method of making titanium dioxide pigment is provided comprising: a) preparing an aqueous slurry of titanium dioxide; b) adding in any order: (i) a polyprotic acid that contains substantially no carboxylic acid to the slurry, ii) an amine, alcohol, and/or alkanol amine to the slurry, wherein the mole ratio of amine, alcohol, and/or alkanol amine to the polyprotic acid is greater than 3:1.

In another exemplary embodiment, a pigment is provided comprising a base particle and a dispersing agent, the dispersing agent comprising a salt and/or ester of: (i) an amine, alcohol, and/or alkanol amine and (ii) an polyprotic acid, wherein the mole ratio of the amine, alcohol, and/or alkanol amine to the polyprotic acid is greater than 3:1; and a solvent.

Additional features and advantages of various embodiments will be set forth in part in the description that follows, and in part will be apparent from the description, or may be learned by practice of various embodiments. Other advantages of various embodiments will be realized and attained by means of the elements and combinations particularly pointed out in the description and appended claims.

DETAILED DESCRIPTION OF THE INVENTION

Figure 1:
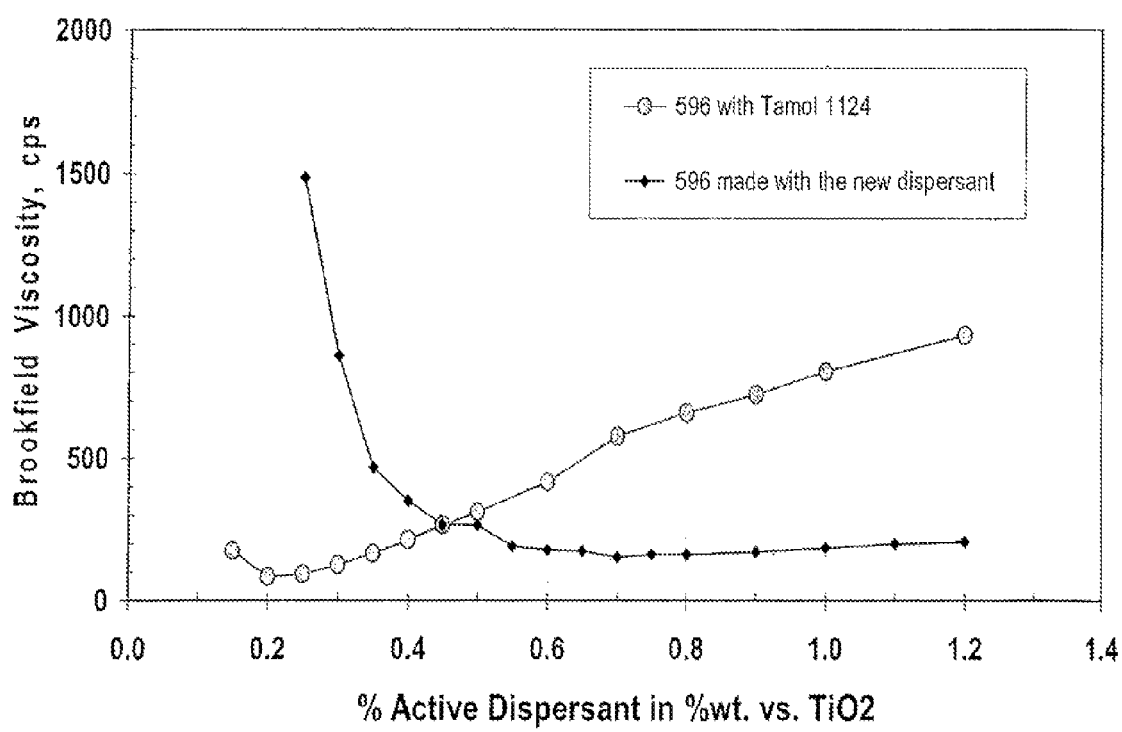
FIG. 1 is a graphic illustration of the viscosity profile of titanium dioxide and the new dispersing agent compared to titanium dioxide pigment and a dispersing agent of the prior art.

For the purposes of this specification and appended claims, unless otherwise indicated, all numbers expressing quantities of ingredients, percentages or proportions of materials, reaction conditions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth, the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges subsumed therein. For example, a range of "1 to 10" includes any and all subranges between (and including) the minimum value of 1 and the maximum value of 10, that is, any and all subranges having a minimum value of equal to or greater than 1 and a maximum value of equal to or less than 10, e.g., 5.5 to 10.

It is noted that, as used in this specification and the appended claims, the singular forms "a," "an," and "the," include plural referents unless expressly and unequivocally limited to one referent. Thus, for example, reference to "a monomer" includes two or more monomers.

Reference will now be made in detail to certain embodiments of the invention. While the invention will be described in conjunction with the illustrated embodiments, it will be understood that they are not intended to limit the invention to those embodiments. On the contrary, the invention is intended to cover all alternatives, modifications, and equivalents, which may be included within the invention as defined by the appended claims.

Pigments

Methods and pigment compositions of the present invention include base particles. The base particle may be inorganic, organic or combinations thereof. Examples of organic base particles include, but are not limited to, perylene, perinone, quinacridone, quinacridonequinone, anthraquinone, anthanthrone, benzimidazolone, disazo condensation, azo, indanthrone, phthalocyanine, triarylcarbonium, dioxazine, aminoanthraquinone, diketopyrrolopyrrole, thioindigo, thiazineindigo, isoindoline, isoindolinone, pyranthrone or isoviolanthrone pigments or combinations thereof. Examples of inorganic base particles include, but are not limited to, oxides of silicon, titanium, zirconium, zinc, magnesium, aluminum, iron or combinations thereof, calcium carbonate, kaolin, talc, clay mica, or combinations thereof. The base particle can be used in the present pigment compositions in a wide variety of weight-percentages easily determined by those skilled in the art.

In various embodiments, the base particle comprises rutile or anatase titanium dioxide or combinations thereof. Titanium dioxide may be manufactured by methods known in the art such as by the chloride or sulfate process. The titanium dioxide may be used directly out of the oxidizer or placed in an aqueous or non-aqueous slurry. Slurries of titanium dioxide can be made by methods known in the art. In various embodiments, the solids content of the slurry is from about 40% to about 85%. Slurry pH and temperature can be determined and adjusted to optimize the wet treatment process by methods known in the art.

In various embodiments, the slurries produced by methods of the present invention can have viscosities spanning a wide range depending on the use of the slurry and the processing conditions and equipment that it will be subjected to (e.g. mixing, filtering, washing, milling, micronizing, pumping, etc.). The slurries of the present invention generally tend to become not readily pumpable at a Brookfield viscosity much greater than about 1500 cps, slurries having a Brookfield viscosity of less than about 1500 cps are preferred, more preferred are slurries with a Brookfield viscosity of less than about 1000 cps.

The titanium dioxide base particle can optionally be surface treated with, for example, silicon compounds, aluminum compounds, zirconium compounds or combination thereof and then used to make the coating. Suitable silicon compounds for wet treatment include, but are not limited to, sodium silicate potassium silicate, or the like. Suitable aluminum compounds for wet treatment include, but are not limited to, sodium aluminate, potassium aluminate, aluminum sulfate, or the like. Suitable zirconium compounds for wet treatment include, but are not limited to, zirconium oxychloride, zirconyl sulfate, or the like. The silicon, aluminum, zirconium compounds can be added in a weight percentage of from about 0.05% to about 5.0% based on the total weight of the titanium base particle.

In various embodiments, after wet treatment, the base particles can be recovered by filtration, washed substantially free of soluble salts adhering to the pigment, dried and then subjected to final comminution using fluid energy milling techniques known in the art. Optionally, the washed and dried pigment can be micronized in a steam micronizer at intensities known by those skilled in the art to produce the desired particle size distribution. In various embodiments, the base particle size comprises from between about 0.1 and about 1 micron.

Optionally, an organic compound, such as for example, trimethylolpropane or pentaerythritol can be added to the pigment during air or steam micronization in amounts from about 0.2% to 0.4% weight percent based on the weight of the titanium dioxide base particle.

In various embodiments, the titanium dioxide particle may be incorporated in to a coating. Typical coatings include a resin, a pigment, a dispersing agent, and other additives. When a coating is applied to a surface, it forms a protective and/or decorative layer on the surface. Examples of coatings include, but are not limited to, paint, stain, varnish, lacquer, plastic or the like.

Coatings of the present invention include one or more resins. Some resins suitable for use in coatings include monomers or polymers or combinations thereof that are compatible with the coating and the end use application. Suitable resins include, but are not limited to, polyester, polyurethane, polyacrylic resins, polyester-epoxy resins or combinations thereof. Suitable polyester resins can be obtained, for example, by polymerization-condensation reaction between a polybasic saturated acid or an anhydride thereof and a polyalcohol.

Some examples of epoxy resins include, but are not limited to, Bisphenol-A resins, novolac epoxy resins, cyclic epoxy resins or combinations thereof. Acrylic resins can be obtained by copolymerization of functional monomers like acrylic acid and various copolymerizable monomers, such as for example, unsaturated olefinic monomers, such as ethylene, propylene and isobutylene, aromatic monomers such as styrene, vinyltoluene, alpha-methyl styrene, esters of acrylic and methacrylic acid with alcohols having from 1 to 18 carbon atoms, such as methyl acrylate, methyl methacrylate, ethyl acrylate, ethyl methacrylate, propyl acrylate, propyl methacrylate, n-butyl acrylate, n-butyl methacrylate, isobutyl acrylate, isobutyl methacrylate, cyclohexyl acrylate, cyclohexyl methacrylate, lauryl acrylate, lauryl methacrylate, vinyl esters of carboxylic acids having 2 to 11 carbon atoms, such as vinyl acetate, vinyl propionate, vinyl-2-ethylhexylacrylate or other co-monomers such as vinyl chloride, acrylonitrile and methacrylonitrile. Some examples of polyurethane resins include, but are not limited to, blocked urethane polymers obtained by polycondensation of isocyanates with various polyols.

Resins include acrylic resin containing at least one hydroxyl group and epoxy group per molecule. Such acrylic resins can be obtained, for example, by copolymerizing a hydroxyl-containing polymerizable monomer, epoxy-containing polymerizable monomer, acrylic polymerizable monomer, and if necessary still other polymerizable monomer(s). A hydroxyl-containing polymerizable monomer is a compound containing at least one hydroxyl group and polymerizable double bond per molecule, examples of which include 2-hydroxyethyl acrylate, 2-hydroxyethyl methacrylate, hydroxypropyl acrylate, hydroxypropyl methacrylate, hydroxybutyl acrylate, hydroxybutyl methacrylate or hydroxyalkyl (meth)acrylates which are obtained by reacting the foregoing with lactones. An epoxy-containing polymerizable monomer is a compound containing at least one each of epoxy group and polymerizable double bond per molecule, examples of which include glycidyl acrylate, glycidyl methacrylate and allylglycidyl ether. Acrylic polymerizable monomers include monoesterified products of acrylic acid or methacrylic acid with $C_1$-$C_{20}$ monoalcohols, specific examples including methyl acrylate, ethyl acrylate, propyl acrylate, butyl acrylate, hexyl acrylate, 2-ethylhexyl acrylate, stearyl acrylate, lauryl acrylate, cyclohexyl acrylate, methyl methacrylate, ethyl methacrylate, propyl methacrylate, butyl methacrylate, hexyl methacrylate, 2-ethylhexyl methacrylate, stearyl methacrylate, lauryl methacrylate and cyclohexyl methacrylate. Furthermore, $C_2$-$C_{20}$ alkoxyalkyl esters of acrylic acid or methacrylic acid can also be used as the acrylic polymerizable monomers.

Preferred resins include an alkyd, acrylic, urethane, polyester, epoxy, vinyl or combinations thereof. Particularly preferred resins include acrylated epoxy soya oil, epoxy acrylate/monomer or oligomer blends, acrylated epoxy linseed oil, nonyl-phenol ethoxylate monoacrylate, phenol ethoxylate monoacrylate, polyethylene glycol 200 diacrylate, aliphatic difunctional acrylate, monofunctional aromatic acrylate, Bisphenol A epoxy diacrylate, Bisphenol A ethoxylate diacrylate, neopentyl glycol propoxylate diacrylate, fatty acid modified epoxy diacrylate, amine modified epoxy diacrylate, 1,6 hexanediol propoxylate diacrylate, tripropylene glycol diacrylate esters, 2-phenoxy ethyl acrylate, difunctional aromatic urethane acrylate, aliphatic difunctional acrylate, polyester acrylate oligomer, acid functional polyester acrylate oligomer, trimethylolpropane propoxylate triacrylate, trimethylolpropane triacrylate esters; trimethylolpropane triacrylate, glyceryl propoxylate triacrylate, or combinations thereof.

In various embodiments, the coating may comprise a solvent. Suitable solvents include, for example, non-aqueous solvents. Some examples of non-aqueous solvents, include, but are not limited to, methyl acetate, ethyl acetate, isopropyl acetate, methoxypropylacetate, methanol, isopropyl alcohol, butanol, methoxypropanol, mineral spirits, petroleum, methylethylketone, ethylethylketone, tetrahydrofuran, butyl acetate, butylglycol, hydrocarbons, or combinations thereof.

In various embodiments, the coating includes binders and/or colorants. The binder binds the pigment particles into a uniform coating film and enhances adherence of the coating to the surface it is applied to. The nature and amount of binder to use are known to those of ordinary skill in the art and may be dependent on the performance properties of the coating, such as for example, washability, toughness, adhesion, and color retention.

Colorants include one or more substances that contribute to the color of the coating. Some examples of colorants include dyes that can be added to the coating to make specific colors.

In various embodiments, the coating may be applied to a surface using any technique known to those skilled in the art including, but not limited to, spray coating, brush coating, powder coating, and application with applicator brushes or blades. Once applied the coating can be cured to form a film. Methods of curing are known in the art and include, but are not limited to, air drying, baking, cold curing, curing with light, such as UV light, microwaves, infrared or combinations thereof.

Dispersing Agent

The pigment compositions of the present invention includes a dispersing agent comprising a salt and/or ester of: (i) an amine, alcohol, and/or alkanol amine and (ii) an inorganic and/or organic polyprotic acid, wherein the mole ratio of the amine, alcohol, and/or alkanol amine to the polyprotic acid is greater than 3:1. In various embodiments, the mole ratio of amine, alcohol, and/or alkanol amine to polyprotic acid is 4:1 to about 20:1. This mole ratio allows for the production of pigments having improved stability, hiding power, tinting strength, and/or gloss.

In various embodiments, the dispersing agent comprises a salt from the reaction of an amine with a polyprotic acid, or the dispersing agent may be a salt or an ester from the reaction of an alcohol or alkanol amine with a polyprotic acid, or a combination of a salt and an ester thereof.

One or more amines, alcohols and/or alkanol amines suitable for use in making the dispersing agent of the present invention include, but are not limited to, amino alcohols, diols, triols, aminopolyols, polyols, primary amines, secondary amines, tertiary amines, quaternary amines or a combination thereof. In various embodiments, the preferred amines and/or alcohols include, but are not limited to, triethylamine, diethylamine, ethylene diamine, diethanolamine, triethanolamine, 2-amino-2-methyl-1-propanol, 1-amino-1-butanol, 1-amino-2-propanol, 2-amino-2-methyl-1,3-propanediol, 2-amino-2-ethyl-1,3-propanediol, 2-amino-2-hydroxymethyl-1,3-propanediol, methanol, isopropyl alcohol, butanol, methoxypropanol, trimethylolethane, trimethylolpropane, pentaerythritol, ethylene glycol, propylene glycol, or a combination thereof.

The one or more polyprotic acids suitable for use in the present invention are capable of losing more than one $H^+$ ion, or proton. In one preferred embodiments, the one or more polyprotic acids contain substantially no carboxylic acid. By "substantially no carboxylic acid" is meant that the polyprotic acid does not contain carboxylic acid or contains a minor or trace amounts. In various embodiments, the polyprotic acid comprises less than 1% carboxylic acid. In one preferred embodiment, the polyprotic acid comprises an inorganic polyprotic acid.

The one or more polyprotic acid may be completely or partially neutralized by the one or more amines and/or alcohols. Suitable polyprotic acids for use in making the dispersing agent of the present invention include, but are not limited to, phosphoric acid, polyphosphoric acid, phosphonic acid, phosphinic acid, metaphosphoric, pyrophosphoric acid, hypophosphoric acid, phosphorous pentaoxide, other phosphorus acid derivatives, or derivatives of any phosphorous containing acids or combinations thereof.

In various embodiments, the dispersing agent can be made by adding the amine, alcohol and/or alkanol amine to the polyprotic acid or vice versa to form the dispersing agent, which comprises the salt and/or ester of an amine, alcohol and/or alkanol amine and the polyprotic acid. In various embodiments, the reactants to make the dispersing agent can be added and mixed using a blender or any other high-speed mixing device to provide uniform mixing at temperature ranges from about 10° C. to about 270° C. However, the present invention is not limited to any particular mixing speed or temperature range.

The method for making the dispersing agent is easily and flexibly incorporated into existing pigment production processes. The amine, alcohol and/or alkanol amine and the polyprotic acid may be added to the pigmentary base particle separately in any order or they may be added as a mixture with solvent such as, for example, water, to the base particle.

In various embodiments, the amine, alcohol and/or alkanol amine or the polyprotic acid or the formed reaction product thereof may be added to the base particles prior to wet treatment, or to a washed filter cake prior to spray drying, or to a high intensity milling device or to a micronizer feed prior to or concurrent with micronization. In various embodiments, the polyprotic acid is added to a pigment slurry before wet treatment and the amine, alcohol and/or alkanol amine is added during micronization of the pigment.

In various embodiments, the dispersing agent of the present invention, when added to a pigment, imparts viscosity stability and resistance to flocculation for the pigment. Typically, the dispersing agent may be present in the pigment composition in weight percentages of up to about 5% based on the weight of the pigment base particle. In various embodiments, the dispersing agent is present in amounts of from about 0.01 to about 2%, based on the weight of the pigment base particle.

Mixing the dispersing agent with the pigment base particle can be accomplished by mixing methods known in the art. Thus, the mixing may be accomplished, for example, with a blender or any other high-speed mixing device. Blade speeds of 50 rpm or higher, for example 1000 rpm to 3000 rpm, are generally preferred for mixing.

The pigment base particle can be subjected to grinding or milling techniques to reduce the particle size of the solids content of the slurry. Grinding or milling can be distinguished from mixing in that in mixing, there is substantially no size reduction of pigments or other solids. Typically, grinding requires use of grinding or milling media that is used to reduce the size of base particles and other solids in the slurry. Some examples of grinding or milling media includes ball or media mills e.g. sand milling, cone and gyratory crushers, disk attrition mills, colloid and roll mills, screen mills and granulators, hammer and cage mills, pin and universal mills, impact mills and breakers, jaw crushers, jet and fluid energy mills, roll crushers, disc mills, vertical rollers, pressure rollers, or the like.

Pigment Properties

In various embodiments, it has been discovered that the pigments produced with the new dispersants by the methods of the present invention have improved stability to pigments made using conventional dispersants. Stability includes the ability of the pigment to resist alteration over time. For example, when the pigment is incorporated into a slurry, some of the improved stability properties include, but are not limited to, improved fluidity, viscosity, pumpability, dispersibility and reduced tendency to flocculate over time. In various embodiments, improved stability includes lessening in the speed, reducing in the quantity, and/or softness of the sedimentation.

Pigment stability can be determined by methods known in the art. Some methods of measuring stability include, but are not limited to, Dynometer Hardness Evaluation tests, Brookfield viscosity tests, visual examination, % solid of the liquid, or the like.

In various embodiments, it has been discovered that the pigments produced with the new dispersants by the methods of the present invention have improved or comparable hiding power to pigments made using conventional dispersants. The hiding power of a pigment is an art recognized term and includes the ability of the pigment to hide or obscure a surface, color or stain over which it has been uniformly applied.

In various embodiments, hiding power includes the minimum film thickness in which the color of the surface coated with the film cannot be recognized with naked eyes. For example, hiding power may include a minimum film thickness when a film is formed on a surface, for example, a black-and-white-checkered surface, which when a visual observation is made from above the film, the black and white color of the surface is substantially unrecognizable. Preferably, the hiding power of a coating includes the area that a unit volume of the wet coating will cover at a film thickness sufficient to produce a contrast ratio of 98% when the film has dried. 98% contrast ratio is used, as it is the limit beyond which any further increase in contrast ratio is not visually detectable by a trained eye. Typically, units of hiding power are $m^2/L^{-1}$ or $ft^2/gal^{-1}$.

In various embodiments, improved hiding power includes increases in hiding power up to about 40% and preferably from about 5% to about 40% increases and more preferably from about 10% to about 20% when compared to pigments without the new dispersing agent.

In various embodiments, it has been discovered that the pigments produced with the new dispersants by the methods of the present invention have improved or comparable tinting strength to pigments made using conventional dispersants. The tinting strength of a pigment is an art recognized term and includes the ability of a pigment or paint to modify the color of another pigment or paint of a different color. For example, in embodiments where the paint contains titanium dioxide, the more the color of the tinter or colored paint is changed (e.g., the less the white is changed) the higher is the tint strength of the white paint.

In various embodiments of the present invention, it has been discovered that the pigments produced with the new dispersants by the methods of the present invention have improved or comparable gloss to pigments made using conventional dispersants. The gloss potential of a pigment can be influenced by, for example, the base particle size and the number of particles with a diameter greater than 500 nanometers. Typically, a high percentage of oversize particles will reduce the gloss potential. Uniform particle sizes give better pigment packing within the film, which will increase gloss potential.

The degree of dispersion of the base particle significantly contributes to the gloss. Improved gloss is achieved when the particle size distribution of the pigment is narrow and the proportion of oversize material is minimized. The dispersing agent imparts improved dispersion performance and flocculation resistance allowing for the production of pigment compositions that demonstrate a high gloss potential in a wide range of coating systems.

Improved gloss includes increases from about 1% to about 100%, more preferably, from about 10% to about 90%, and most preferably, form about 20% to about 60%. Gloss can be determined by methods known in the art. For example, the gloss can be determined by incorporating the pigment into a coating paint and measuring gloss using a gloss meter at, for example, 20°, 45°, 60° and 85° angles.

Having now generally described the invention, the same may be more readily understood through the following reference to the following examples, which are provided by way of illustration and are not intended to limit the present invention unless specified.

EXAMPLES

These examples show, in various embodiments, that pigments made using the new dispersing agents have stability, hiding power, tinting strength and/or gloss similar to or better than pigments made with commercially available dispersing agents.

Example 1

With continuous stirring, 10.2 gm of polyphosphoric acid (commercially available from Aldrich chemicals) was added to a 100 gm of triethanolamine (commercially available from Aldrich chemicals). Upon addition, the temperature raised to 50-60° C. and then slowly decreased to room temperature. At 40° C.-room temperature, the reaction mixture was diluted with 40-45 gm of water. The mixture was then stirred until all of the gel that was initially formed dissolves in the water added.

Example 2

A dispersant demand procedure was conducted to determine the amount of dispersant needed to yield the lowest viscosity. The procedure is as follows: Weigh 184.3 grams of deionized water into a beaker and weigh 600 grams of $TiO_2$ into a scoop. With the Dispermat set at the lowest speed, slowly sift the $TiO_2$ into the water. Add predetermined increments of dispersant as necessary. To determine the volume of dispersant to add per increment, use the formula below:

76.5% Solids Calculation:

| cc's = | cc's of dispersant per increment |
|---|---|
| S = | percent solids of dispersant (decimal) |
| Sp. G. = | specific gravity of dispersant (g/cc) |

The usual increment is 0.05% active dispersant on $TiO_2$ weight, but other amounts can also be used. After all the titanium dioxide is added, disperse for five minutes at 5000 rpm, and then measure the viscosity. Continue adding increments of the dispersant and record the viscosity after each addition. Record the viscosity and the amount of dispersant used. Repeat the above steps until a minimum of four readings are obtained past the point of lowest viscosity. FIG. 1 clearly indicates, that even though more of the new dispersant is needed to achieve the same viscosity as that obtained from the Tamol® (commercially available, trade mark of Rohm & Hass) the former still generates a much better viscosity profile than that of the later. Accidental increase in the amount of Tamol would have a negative response on the slurry viscosity, while that of the new dispersant would have a very minor effect, as seen in FIG. 1. Such an effect would allow a wider window for the plant to operate-in and high through-put production.

Example 3

Two ~76.5% slurry samples were prepared by mixing 184.3 gm of water with 600 gm of titanium dioxide (Tiona® 596, available from Millennium Chemicals), using 4.3 gm (50% solid) of the Tamol® 1124 (obtained from Rohm & Hass) as a dispersant in one and 5.2 gm of (67% solid) of the above new prepared dispersant in the other. The % solid and the Brookfield viscosity was determined for the above two samples and compared to that obtained from the dispersant demand data.

Figure 2:
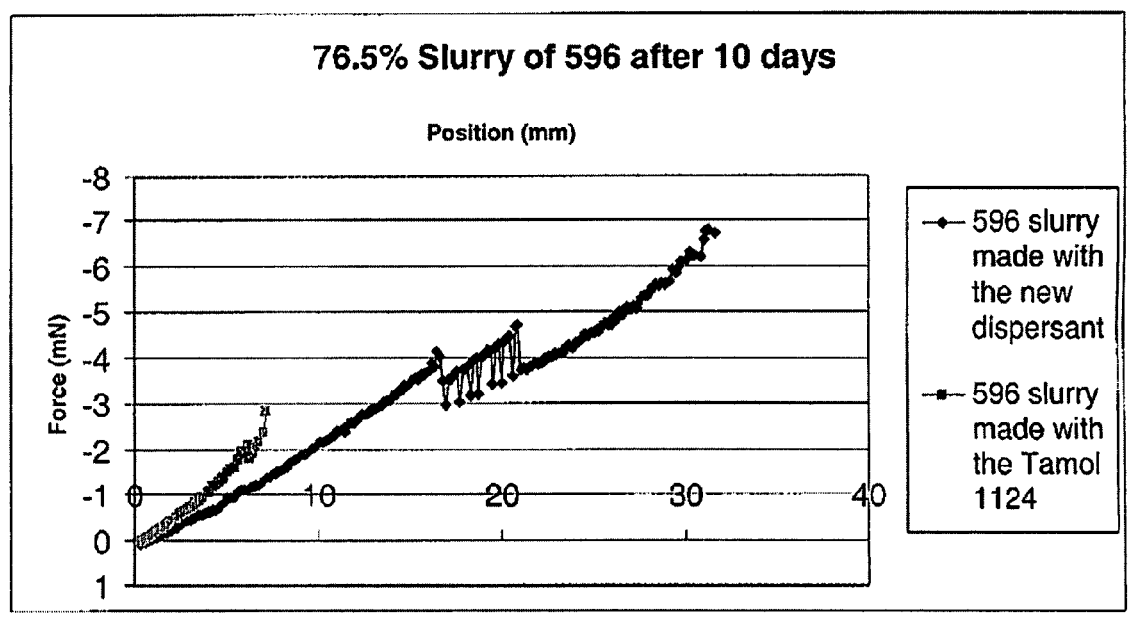
FIG. 2 is a graphic illustration of a Dynometer Hardness Evaluation test for titanium dioxide pigment stored for 10 days having the new dispersing agent compared to titanium dioxide pigment having a dispersing agent of the prior art. The Dynometer Hardness Evaluation test determines the force needed to pass a probe through the titanium dioxide slurry.

Fill two 30 ml Nalgene bottles with exactly 76.2 gm, in each, of 596 slurry prepared using the Tamol® 1124 in one and that prepared using the new dispersant in the other. After 10 days, open the bottles carefully so not to disturb the contents any more than necessary. Carefully pour all the liquid that will flow in a continuous stream. Stop pouring at the first point in which the continuous stream breaks. Conduct Dynometer Hardness Evaluation test results shown in FIG. 2. The graph of dynometer data (graph 2) shows the 596 slurry prepared with the new dispersant has more settled material in the container as evidenced by an increased number of readings provided by the dynometer.

The 596 slurry made with the current dispersant (Tamol 1124) (available from Rohm & Hass) exhibits less settled material in the container. The properties of the settled material in each of the samples is the subject for discussion of product stability and performance. The dynometer measures sedimentation by mechanically forcing a probe through the settled material. The deeper the probe penetrates into the settled material the more dense the sedimentation is. Applying this principle to the data from the sample prepared with Tamol 1124, the last reading by the dynometer would be infinite. The dynometer encountered settled material that is too hard for the probe to penetrate without damaging the equipment. This is also experienced when the settled material in the sample of Tiona 596 made with Tamol 1124 is probed with a spatula by hand. It is difficult to force a spatula through the settled material at the bottom of the container of Tiona 596 slurry made with Tamol 1124. The sediment is very sticky and it is difficult to move the spatula indicating that the settled material would be very difficult to reincorporate after settling. Hand shaking the container does not enable any of the settled material to be removed from the container. Applying the same evaluations to the slurry made with the new dispersant yields dramatically different results. The dynometer is able to penetrate the settlement completely, passing through the settled layers of material until the probe contacts the bottom of the container where the dynometer encounters infinite hardness. Probing the settled material with a spatula by hand supports this observation. The spatula easily passes through the settled material, which is readily moved, and is very soft. The container of settled material of slurry made with the new dispersant was shaken by hand and all of the settled material was poured from the container. This indicates that the slurry made with the new dispersant, even though it settles more than that made with the Tamol 1124, but the settlement is thixotropic in nature making reincorporation of the settled material possible with an ease. On the basis of ease of reincorporation, the sample of Tiona 596 slurry made with the new dispersant package outperforms the sample made with the Tamol 1124.

From these observations, one would predict that sparging in rail road cars will have little or no effect on slurries' sediments made with the Tamol® 1124, while that made with the new dispersion will become very fluid and hence it will be much easier to pump-out.

Example 4

Supplier List for Formulas

MCH TiO2 Slurry Formula:

| | |
|---|---|
| Water | Baltimore City Water Supply |
| Tamol 1124 | Rohm and Haas |
| AMP-95 | Dow Chemical |
| TiO2 | Millennium Chemicals |

Interior High Gloss Enamel (S-11)

| | |
|---|---|
| Water | Baltimore City Water Supply |
| QP-4400 | Dow Chemical |
| Propylene Glycol | Lyondell |
| Hexylene Glycol | Dow Chemical |
| Rhoplex AC-417 | Rohm and Haas |

Exterior Gloss Acrylic Trim Paint (D-603)

| | |
|---|---|
| Water | Baltimore City Water Supply |
| QP-4400 | Dow Chemical |
| Propylene Glycol | Lyondell |
| Colloids 650 | Rhodia |
| Triton CA | Dow Chemical |
| Nuosept 635 W | Creanova |
| Ammonium Hydroxide | Fisher Scientific |
| Texanol | Eastman Chemical |
| AC-2507 | Rohm and Haas |
| Lampblack S88-9907B | Degussa |

Interior High PVC Flat Latex Paint (60 PVC)

| | |
|---|---|
| Water | Baltimore City Water Supply |
| Tergitol NP9 | Dow Chemical |
| 551 Soya Lecithin | Ross and Rowe |
| Busan 1025 | Buckman Lab. |
| Collids 581-B | Vinings |
| QP-4400 | Dow Chemical |
| Ammonium Hydroxide | Fisher Scientific |
| KTPP | Fisher Scientific |
| Omyacarb UF | OYMA |
| Vantalac 6H | Vanderbilt |
| Ethylene Glycol | Ashland |
| Carbitol Solvent | Dow Chemical |
| UCAR 367 | Dow Chemical |
| Dramatone Black Y-1782 | Huls America |

HG-700 Interior High Gloss Latex Paint

| | |
|---|---|
| HG-700 | Rohm and Haas |
| Propylene Glycol | Lyondell |
| BYK-022 | BYK-Chemie |
| Texanol | Eastman |
| Triton X-405 | Dow Chemical |
| TiO2 | Millennium Chemicals |
| Water | Baltimore City Water Supply |
| Sodium Benzoate | BF-Goodrich |
| Kathon LX 1.5% | Rohm and Haas |
| Tamol 681 | Rohm and Haas |
| Acrysol RM-2020 NPR | Rohm and Haas |
| Acrysol RM-825 | Rohm and Haas |
| Lampblack 888-9907B | Degussa |

Testing of $TiO_2$ Dry/Slurry in an Interior High PVC Flat Latex Paint (60PVC)

A small quantity of interior high PVC (pigment volume concentration) flat latex paint was prepared with each of the $TiO_2$ samples.

The Formula for the Test Paint is as Follows:

Paint Preparation from $TiO_2$ Slurry

| | |
|---|---|
| $TiO_2$ slurry | enough to provide 200.02 grams of dry $TiO_2$ |
| Water | enough to dilute the above $TiO_2$ slurry to constant solids of 48.40% |
| Base Paint | 745.1 grams |

The $TiO_2$ solids of each slurry are slightly different. This is compensated for by the amount of water used. This insures a consistent amount of $TiO_2$ is used in each test paint.

Paint Preparation from Dry $TiO_2$

The Formula for the Base Paint is as Follows:

Interior High PVC Flat Latex Paint (60 PVC) White and Light Tint

| Paint from Slurry TiO₂ | | | Paint from Dry TiO₂ | | |
|---|---|---|---|---|---|
| Material | Pounds | Gallons | Material | Pounds | Gallons |
| Water | 57.23 | 6.87 | Water | 78.32 | 9.40 |
| Tergitol ® NP-10 (J T Baker) | 1.18 | 0.13 | Tergitol NP-10 | 1.61 | 0.18 |
| R&R 551 | 2.95 | 0.34 | R&R 551 | 4.04 | 0.46 |
| Busan 1025 | 0.59 | 0.08 | Busan 1025 | 0.81 | 0.10 |
| Colloids 581-B | 0.24 | 0.03 | Colloids 581-B | 0.32 | 0.04 |
| Cellosize QP-4400 | 1.77 | 0.43 | Cellosize QP-4400 | 2.42 | 0.58 |
| Ammonium Hydroxide (28%) | 0.00 | 0.00 | Ammonium Hydroxide (28%) | 0.00 | 0.00 |
| KTPP | 0.82 | 0.08 | KTPP | 1.22 | 0.12 |
| Water | 44.25 | 5.31 | Water | 150.49 | 18.07 |
| Omyacarb UF | 73.75 | 3.27 | Omyacarb UF | 109.82 | 4.86 |
| | | | Flat Grade TiO2 | 162.69 | 5.21 |
| Vantalc 6H | 60.09 | 2.62 | Vantalc 6H | 89.48 | 3.90 |
| Grind 15 minutes | | | Grind 15 minutes | | |
| Letdown | | | Letdown | | |
| Water | 142.48 | 17.10 | Water | 143.74 | 17.26 |
| Ethylene Glycol | 44.25 | 4.74 | Ethylene Glycol | 17.10 | 1.83 |
| Carbitol Solvent | 19.47 | 2.27 | Carbitol Solvent | 7.53 | 0.88 |
| Busan 1025 | 0.00 | 0.00 | Busan 1025 | 0.00 | 0.00 |

-continued

| Interior High PVC Flat Latex Paint (60 PVC) White and Light Tint | | | | | |
|---|---|---|---|---|---|
| Cellosize QP-4400 | 44.25 | 10.62 | Cellosize QP-4400 | 17.10 | 4.11 |
| Ammonium Hydroxide | 0.00 | 0.00 | Ammonium Hydroxide | 0.00 | 0.00 |
| Ucar 367 | 417.36 | 46.12 | Ucar 367 | 298.70 | 33.01 |
| Totals | 910.68 | 100.00 | Totals | 1085.40 | 100.00 |

The Formula for the Tinting Paste is as Follows:

| Material | Pounds | Gallons |
|---|---|---|
| Water | 160.92 | 19.32 |
| Cellosize QP 4400 | 4.98 | 1.19 |
| Water | 331.78 | 39.83 |
| Busan 1025 | 0.01 | 0.00 |
| Dramatone Black Y-1782 | 497.68 | 39.66 |
| Total | 995.37 | 100.00 |

Paint Manufacturing Procedure

This base paint is prepared in advance in sufficient amount to test multiple samples of slurry. Pigment grinds are conducted on high-speed disperser equipment fitted with a cowles style blade. The above listed materials are added to each other in order with sufficient agitation to insure uniformity without whipping air into the batch. This is accomplished with an electric stand mixer fitted with a paddle agitator. Individual test paints are prepared by mixing the slurry and water together and then adding this into the base paint using an electric mixer, with a paddle agitator, at moderate speed. A gray tint of each test paint is also prepared by mixing 7 grams of black tinting base into 200 grams of white test paint. These are weighed into a ½ pint can and then mixed together on a Red Devil Paint Conditioner for 4 minutes.

Test Panel Preparation

Test panels were prepared with the test paints by drawing them down side by side with a control paint. The following charts were made:

| Chart Type | Applicator | Property to be evaluated |
|---|---|---|
| Leneta WB | .002 mil Bird | Tint Strength & Tint Tone |
| Leneta WB | .006 mil Bird | Color, Brightness Masstone, Gloss |

The test panels are cured overnight in a constant temperature and humidity cabinet set for 50% relative humidity at 22° C.

Measurements of Performance Properties

When cured, the panels are evaluated for the appropriate property as follows:

Brightness, Masstone, Tint Strength, and Tint Tone are read on a BYK Gardner Spectrophotometer Model Color Sphere or a BYK Gardner Color View 45-0 Color meter. Both of these instruments are set to measure using the CIE L*a*b* color scale, illuminant C, at a 2 degree observer.

Gloss measurements are made with a BYK Gardner Haze Gloss Meter. This instrument can measure 20-degree, 60-degree and 85-degree gloss as well as Haze. Test paints are compared to the control paint on the same test panel. Differences from this control are calculated and reported.

Testing of $TiO_2$ Dry/Slurry in an Interior High Gloss Enamel (S11)

A small quantity of interior high gloss enamel paint was prepared with each of the $TiO_2$ samples. The preparation of these $TiO_2$ slurries is described elsewhere.

The Formula for the Test Paint is as follows:

Paint Preparation from $TiO_2$ Slurry $TiO_2$ slurry enough to provide 124.42 grams of dry $TiO_2$
Water enough to dilute the above $TiO_2$ slurry to a constant solids of 70.0%
Base Paint 356.5 grams Paint Preparation from Dry $TiO_2$ A lab made slurry is prepared according to the formulation listed below:

Lab Made Slurry Formula

| Material | Pounds | Gallons |
|---|---|---|
| Water | 304.79 | 36.59 |
| Tamol ® 1124 | 9.88 | 0.99 |
| AMP-95 | 2.47 | 0.30 |
| $TiO_2$ | 1230.02 | 36.92 |
| Grind 15 minutes | | |
| Reduction Water | 209.94 | 25.20 |
| Low Speed | | |
| Total | 1757.10 | 100.00 |

The Formula for the Base Paint is as Follows:

| Interior High Gloss Enamel (S-11) White Only | | |
|---|---|---|
| Material | Pounds | Gallons |
| Water | 41.41 | 4.97 |
| QP-4400 | 1.06 | 0.25 |
| Propylene Glycol | 75.13 | 8.70 |
| Hexylene Glycol | 39.66 | 5.16 |
| Rhoplex AC-417 | 712.04 | 80.91 |
| Total | 869.31 | 100.00 |

Paint Manufacturing Procedure

This base paint is prepared in advance in sufficient amount to test multiple samples of slurry. Pigment grinds are conducted on high-speed disperser equipment fitted with a cowles style blade. The listed materials are added to each other in order with sufficient agitation to insure uniformity without whipping air into the batch. This is accomplished with an electric stand mixer fitted with a paddle agitator. Individual test paints are prepared by mixing the slurry and water together and then adding this into the base paint using an electric mixer, with a paddle agitator, at moderate speed.

Test Panel Preparation

Test panels were prepared with the test paints by drawing them down side by side with a control paint. The following charts were made:

| Chart Type | Applicator | Property to be evaluated |
|---|---|---|
| Leneta Black & White | .002 mil Bird | Contrast Ratio, Color, Brightness Masstone, Gloss |

The test panels are cured overnight in a constant temperature and humidity cabinet set for 50% relative humidity at 22° C.

Measurements of Performance Properties

When cured, the panels are evaluated for the appropriate property as follows:

Brightness, Masstone, and Opacity are read on a BYK Gardner Spectrophotometer Model Color Sphere or a BYK Gardner Color View 45-0 Color meter. Both of these instruments are set to measurements using the CIE L*a*b* color scale, illuminant C, at a 2 degree observer. Gloss measurements are made with a BYK Gardner Haze Gloss Meter. This instrument can measure 20-degree, 60-degree and 85-degree gloss as well as Haze. Test paints are compared to the control paint on the same test panel. Differences from this control are calculated and reported.

Testing of $TiO_2$ Dry/Slurry in an Exterior Gloss Acrylic Trim Paint (D-603)

A small quantity of exterior gloss acrylic trim paint was prepared with each of the $TiO_2$ samples.

The Formula for the Test Paint is as Follows:

Paint Preparation from $TiO_2$ Slurry

| | |
|---|---|
| $TiO_2$ slurry | enough to provide 87.50 grams of dry $TiO_2$ |
| Water | enough to dilute the above $TiO_2$ slurry to a constant solids of 70.0% |
| Base Paint | 362.2 grams |

Paint Preparation from Dry TiO2

A lab made slurry is prepared according to the formulation listed below:

| Lab Made Slurry Formula | | |
|---|---|---|
| Material | Pounds | Gallons |
| Water | 304.79 | 36.59 |
| Tamol ® 1124 | 9.88 | 0.99 |
| AMP-95 | 2.47 | 0.30 |
| $TiO_2$ | 1230.02 | 36.92 |
| Grind 15 minutes | | |
| Reduction | 209.94 | 25.20 |
| Water Low Speed | | |
| Total | 1757.10 | 100.00 |

Exterior Gloss Acrylic Trim Paint D-603

| White and Light Tint | | |
|---|---|---|
| Material | Pounds | Gallons |
| Water | 80.83 | 9.70 |
| QP4400 | 2.50 | 0.60 |
| Propylene Glycol | 119.04 | 13.78 |
| Colloids 650 | 3.57 | 0.48 |
| Triton CA | 2.38 | 0.29 |
| Nuosept 635W | 1.19 | 0.12 |
| Ammonium Hydroxide (28%) | 2.38 | 0.32 |
| Texanol | 17.86 | 2.26 |
| Water | 41.68 | 5.00 |
| AC-2507 | 590.78 | 67.44 |
| Total | 862.20 | 100.00 |

The Formula for the Tinting Paste is as Follows:

| Material | Pounds | Gallons |
|---|---|---|
| Color trend Lampblack 888-9907B | 297.17 | 25.48 |
| D-603 Base Paint | 742.94 | 74.52 |
| Total | 1040.11 | 100 |

Paint Manufacturing Procedure

This base paint is prepared in advance in sufficient amount to test multiple samples of slurry. $TiO_2$ slurry is produced on high-speed disperser equipment fitted with a cowles type blade. The liquid portion is added together in a static state, and the dry $TiO_2$ is added slowly under agitation. Any reduction water added is incorporated at lower RPM's and is added under agitation.

The listed paint base materials are added to each other in order with sufficient agitation to insure uniformity without whipping air into the batch. This is accomplished with an electric stand mixer fitted with a paddle agitator. Individual test paints are prepared by mixing the slurry and water together and then adding this into the base paint using an electric mixer, with a paddle agitator, at moderate speed.

A gray tint of each test paint is also prepared by mixing 7 grams of black tinting paste into 200 grams of white test paint. These are weighed into a ½ pint can and then mixed together on a Red Devil Paint Conditioner for 4 minutes.

Test Panel Preparation

Test panels were prepared with the test paints by drawing them down side by side with a control paint. The following charts were made:

| Chart Type | Applicator | Property to be evaluated |
|---|---|---|
| Leneta WB | .002 mil Bird | Tint Strength & Tint Tone |

The test panels are cured overnight in a constant temperature and humidity cabinet set for 50% relative humidity at 22° C.

Measurements of Performance Properties

When cured, the panels are evaluated for the appropriate property as follows:

Tint Strength and Tint Tone are read on a BYK Gardner Spectrophotometer Model Color Sphere or a BYK Gardner Color View 45-0 Color meter. Both of these instruments are set to measure using the CIE L*a*b* color scale, illuminant C, at a 2 degree observer.

Gloss measurements are made with a BYK Gardner Haze Gloss Meter. This instrument can measure 20-degree, 60-degree and 85-degree gloss as well as Haze. Test paints are compared to the control paint on the same test panel. Differences from this control are calculated and reported.

Testing of $TiO_2$ Slurry in High Gloss Latex Paint Based on HG-700 Latex

A small quantity of high gloss latex paint was prepared with each of the $TiO_2$ slurry samples. The preparation of these $TiO_2$ slurries is described elsewhere.

The Formula for the Test Paint is a Follows:

| | |
|---|---|
| $TiO_2$ slurry | enough to provide 86.29 grams of dry $TiO_2$ |
| Water | enough to dilute the above $TiO_2$ slurry to a constant solids of 70.0% |
| Base Paint | 208.68 grams |

The $TiO_2$ solids of each slurry are slightly different. This is compensated for by the amount of water used. This insures a consistent amount of $TiO_2$ is used in each test paint.

| Paint from Dry TiO2 | | | |
|---|---|---|---|
| Material | Pounds | Gallons | |
| HG-700 | 611.35 | 69.08 | |
| Propylene Glycol | 30.00 | 3.47 | |
| BYK -022 | 2.00 | 0.24 | |
| Texanol | 21.18 | 2.67 | |
| Triton X-405 | 2.30 | 0.25 | |
| TiO2 | 302.13 | 15.55 | |
| | Premix | | |
| Water | 2.00 | 0.24 | |
| Sodium Benzoate | 1.00 | 0.06 | |
| Kathon LX 1.5% | 1.00 | 0.12 | |
| Water | 28.20 | 3.38 | |
| | Premix | | |
| Water | 21.28 | 2.55 | |
| Tamol 681 | 1.98 | 0.22 | |
| | Adjust ICI 1.2-1.5 | | |
| Acrysol RM-2020 NPR | 18.00 | 2.07 | |
| | Adjust KU 90-95 | | |
| Acrysol RM-825 | 1.00 | 0.12 | |
| Totals | 1043.42 | 100.00 | 19.50% PVC |

Paint Manufacturing Procedure

This base paint is prepared in advance in sufficient amount to test multiple samples of slurry. The listed materials are added to each other in order with sufficient agitation to insure uniformity without whipping air into the batch. This is accomplished with an electric stand mixer fitted with a paddle agitator. Individual test paints are prepared by mixing the slurry and water together and then adding this into the base paint using an electric mixer, with a paddle agitator, at moderate speed. A gray tint of each test paint is also prepared by mixing 2 grams of black universal tinting color (Colortrend Lampblack 888-9907B) into 200 grams of white test paint. These are weighed into a ½ pint can and then mixed together on a Red Devil Paint Conditioner for 5 minutes.

Test Panel Preparation

Test panels were prepared with the test paints by drawing them down side by side with a control paint. The following charts were made:

| Chart Type | Applicator | Property to be evaluated |
|---|---|---|
| Leneta WB | .002 mil Bird | Tint Strength & Tint Tone |
| Leneta Black & White | .002 mil Bird | Contrast Ratio, Color, Brightness Masstone, Gloss |

The test panels are cured overnight in a constant temperature and humidity cabinet set for 50% relative humidity at 22° C.

Measurements of Performance Properties

When cured, the panels are evaluated for the appropriate property as follows:

Brightness, Masstone, Tint Strength, Tint Tone, and Opacity are read on a BYK Gardner Spectrophotometer Model Color Sphere or a BYK Gardner Color View 45-0 Color meter. Both of these instruments are set to measure using the CIE L*a*b* color scale, illuminant C, at a 2 degree observer.

Gloss measurements are made with a BYK Gardner Haze Gloss Meter. This instrument can measure 20 degree, 60 degree and 85 degree gloss as well as Haze.

Test paints are compared to the control paint on the same test panel. Differences from this control are calculated and reported.

Results and Discussion:

| S-11 Gloss and Contrast Ratio | | | | | | | |
|---|---|---|---|---|---|---|---|
| Sample | L* | a* | b* | L* over Black | CR | 20 deg gloss | 60 deg gloss |
| Tiona 596S Unmodified | 95.9 | −0.7 | 0.8 | 93.1 | 0.9705 | 15.3 | 60.7 |
| Tiona 596S Modified | 95.7 | −0.6 | 0.7 | 92.7 | 0.9687 | 17.8 | 65.2 |
| Tiona 595S Unmodified | 95.8 | −0.7 | 0.8 | 93.3 | 0.9736 | 30.0 | 77.6 |
| Tiona 595S Modified | 95.8 | −0.7 | 0.7 | 93.0 | 0.9714 | 25.2 | 72.6 |

D-603 Tint Strength and Tint Tone

| Sample | L* | a* | b* | % TS | Tint Tone |
|---|---|---|---|---|---|
| Tiona 596S Unmodified | 79.2 | −0.8 | −3.2 | STD | STD |
| Tiona 596S Modified | 79.5 | −0.8 | −3.1 | 100.4 | 0.1 |
| Tiona 595S Unmodified | 78.9 | −0.8 | −3.2 | STD | STD |
| Tiona 595S Modified | 79.4 | −0.8 | −3.1 | 100.6 | 0.1 |

60PVC- Tint Strength, Tint Tone, Color

| | White- 6 mil | | | 60 deg | 85 deg | Tint- 2 mil | | | | Delta |
|---|---|---|---|---|---|---|---|---|---|---|
| Sample | L* | a* | b* | Gloss | Gloss | L* | a* | b* | % TS | b* |
| RCS-3 Unmodified | 97.7 | −0.7 | 2.5 | 2.9 | 18.2 | 80.8 | −0.6 | −1.6 | STD | STD |
| RCS-3 Modified | 97.8 | −0.7 | 2.5 | 2.9 | 19.1 | 81.1 | −0.6 | −1.4 | 100.5 | 0.2 |

The above tests compared the optical property performance of the developmental slurry against that we are currently using. Several different paint formulations were used.

Interior Acrylic Latex Trim Paint (S-11)

The standard recipe of Tiona 596 slurry (without the new dispersing agent) and developmental recipe of Tiona 596 slurry having the new dispersing agent were compared. The properties of brightness, undertone, contrast ratio and gloss were evaluated.

For Tiona 596 slurry: These results indicate that the performance of the developmental slurry recipe is very close to the performance of the standard one. The brightness is 99.8% and the undertone is 0.1 bluer than the standard, which are within the experimental error of the test. The contrast ratio is 99.8% of the standard recipe, which is also within test variability. Three units increase in 20 degree gloss and 4 units higher in the 60 degree gloss are a noticeable difference and it is above the threshold of visual difference.

For the Tiona 595 slurry: The brightness is equal and the undertone is 0.1 bluer than the standard. These values are within the experimental error of the test. The contrast ratio is 99.8% of the standard recipe. This also should be considered equal and within test variability. 5 units decreased in 20 degree gloss and 5 units lower at 60 degree gloss are significantly lower than the standard. This is a noticeable difference and it is above the threshold of visual difference.

Exterior Gloss Acrylic Trim Paint (D-603)

The same above samples were tested for the optical properties and tint strength and the tint tone.

For Tiona 596 slurry: The results show the tinting strength of the developmental recipe to be 100.4% of the standard recipe, a noticeable difference. The tint tone is within 0.1 units compared to that of the standard recipe, which is in experimental error. These results clearly show an improvement in strength over the current slurry recipe.

For Tiona 595: These results show the tinting strength of the developmental recipe to be 100.6% of the standard recipe, a noticeable difference. The tint tone is within 0.1 units compared to the standard recipe, which is in experimental error. These results clearly show an improvement in strength over the current slurry recipe.

Acrylic Very High Gloss Latex Paint Based on HG-700 Resin

As in the other formulas, the developmental slurry recipe was compared to a standard recipe. The results show the color (brightness and masstone) of the developmental recipe made with Tiona 596 is equal to the optical control of the standard recipe. The gloss of the developmental recipe is 3 units higher at 20 degrees and 1 unit higher at 60 degrees, which is almost at the test variability limits. The contrast ratio is equal to the standard and the tinting strength and tone are all within test variability limits.

The developmental slurry recipe made with Tiona 595 is 99.9% in brightness and 0.1 yellower compared to the standard, which is in experimental error. The gloss is −5 units at 20 Degrees and −2 units at 60 degrees. The 20 Degree reading is significantly lower than the standard. Contrast ratio are equal to the standard recipe, however, the tint strength and tone are 99.7% and 0.2 yellower, respectively. The former is just slightly above the experimental error.

Interior High PVC Flat Latex Paint (60PVC)

The results indicate that the brightness, the gloss at 60 and 85 degrees, and the mass tone are all almost equal and are within experimental error. However, the tint tone is 0.2 units higher and the tint strength is 100.4% for the developmental slurry, which is a noticeable improvement over the standard.

It will be apparent to those skilled in the art that various modifications and variations can be made to various embodiments described herein without departing from the spirit or scope of the teachings herein. Thus, it is intended that various embodiments cover other modifications and variations of various embodiments within the scope of the present teachings.

What is claimed:

1. A method of making titanium dioxide pigment comprising adding a polyprotic acid to an amine, alcohol, and/or alkanol amine; wherein the mole ratio of amine, alcohol, and/or alkanol amine to polyprotic acid is greater than 3:1, to form a dispersing agent having a mole ratio of amine, alcohol, and/or alkanol amine to polyprotic acid of greater than 3:1; and adding titanium dioxide to the dispersing agent to make the titanium dioxide pigment, wherein the titanium dioxide has a particle size range of between about 0.1 and about 1 micron.

2. A method of making titanium dioxide pigment according to claim 1, wherein the pigment has improved stability, gloss, hiding power, tint strength or a combination thereof.

3. A method of making titanium dioxide pigment according to claim 1, wherein the polyprotic acid comprises phosphoric acid, polyphosphoric acid, phosphonic acid, metaphosphoric acid, phosphinic acid, pyrophosphoric acid, hypophosphoric acid, phosphorous pentaoxide, other phosphorus acid derivatives, or any other phosphorous containing acids or combinations thereof and the amine or alcohol or alkanol amine comprises at least one amino alcohol, diol, aminopolyol, polyol, primary amine, secondary amine, tertiary amine or combination thereof.

4. A method of making titanium dioxide pigment according to claim 3, wherein the amine, alcohol, and/or alkanol amine comprises triethanolamine, 2-amino-2-methyl-1 propanol, 1-amino-1-butanol, 1-amino-2-propanol, 2-amino-2-methyl-1,3-propanediol, 2-amino-2-ethyl-1,3-propanediol, 2-amino-2-hydroxymethyl1-1,3-propanediol, methanol, isopropyl alcohol, butanol, methoxypropanol, trimethylolethane, trimethylolpropane, pentaerythritol, ethylene glycol, propylene glycol, or combination thereof.

5. A method of making titanium dioxide pigment according to claim 1, wherein the dispersing agent comprises from about 0.01 percent to about 5 percent by weight based on the weight of titanium dioxide.

6. A method of making titanium dioxide pigment according to claim 1, wherein the titanium dioxide is treated with silica, zirconia, alumina, or combination thereof.

7. A method of making titanium dioxide pigment according to claim 1, wherein the mole ratio of the amine, alcohol and/or alkanol amine to the polyprotic acid is from 4:1 to about 20:1.

8. A method of making titanium dioxide pigment comprising adding a polyprotic acid to an amine, alcohol, and/or alkanol amine; wherein the polyprotic acid contains substantially no carboxylic acid, and wherein the mole ratio of amine, alcohol, and/or alkanol amine to polyprotic acid is greater than 3:1, to form a dispersing agent having a mole ratio of amine, alcohol, and/or alkanol amine to polyprotic acid of greater than 3:1; and adding titanium dioxide to the dispersing agent to make the titanium dioxide pigment.

9. A method of making titanium dioxide pigment according to claim 8, wherein the polyprotic acid comprises phosphoric acid, polyphosphoric acid, phosphonic acid, metaphosphoric acid, phosphinic acid, pyrophosphoric acid, hypophosphoric acid, phosphorous pentaoxide, other phosphorus acid derivatives, or any other phosphorous containing acids or combinations thereof and the amine or alcohol or alkanol amine comprises at least one amino alcohol, diol, aminopolyol, polyol, primary amine, secondary amine, tertiary amine or combination thereof.

10. A method of making titanium dioxide pigment according to claim 9, wherein the amine, alcohol, and/or alkanol amine comprises triethanolamine, 2-amino-2-methyl-1 propanol, 1-amino-1-butanol, 1-amino-2-propanol, 2-amino-2-methyl-1,3-propanediol, 2-amino-2-ethyl-1,3-propanediol, 2-amino-2-hydroxymethyl1-1,3-propanediol, methanol, isopropyl alcohol, butanol, methoxypropanol, trimethylolethane, trimethylolpropane, pentaerythritol, ethylene glycol, propylene glycol, or combination thereof.

11. A method of making titanium dioxide pigment according to claim 8, wherein the dispersing agent comprises from about 0.01 percent to about 5 percent by weight based on the weight of titanium dioxide.

12. A method of making titanium dioxide pigment according to claim 8, wherein the titanium dioxide is treated with silica, zirconia, alumina, or combination thereof.

13. A method of making titanium dioxide pigment according to claim 8, wherein the mole ratio of the amine, alcohol and/or alkanol amine to the polyprotic acid is from 4:1 to about 20:1.

14. A method of making titanium dioxide pigment comprising: a) preparing an aqueous slurry of titanium dioxide; b) adding in any order: (i) a polyprotic acid that contains substantially no carboxylic acid to the slurry, ii) an amine, alcohol, and/or alkanol amine to the slurry, wherein the mole ratio of amine, alcohol, and/or alkanol amine to the polyprotic acid is greater than 3:1.

15. A method of making titanium dioxide pigment according to claim 14, wherein the polyprotic acid is added to the slurry before wet treatment and the amine, alcohol, and/or alkanol amine is added during micronization of the pigment.

16. A method of making titanium dioxide pigment according to claim 14, wherein the polyprotic acid and the amine, alcohol, and/or alkanol amine is added to the titanium dioxide prior to wet treating, filtering, drying or micronizing the titanium dioxide.

17. A method of making titanium dioxide pigment according to claim 14, wherein the polyprotic acid and the amine, alcohol, and/or alkanol amine are added to the titanium dioxide pigment as a mixture.

18. A method of making titanium dioxide pigment according to claim 14, wherein the polyprotic acid and the amine, alcohol, and/or alkanol amine are added to the titanium dioxide pigment separately.

19. A method of making titanium dioxide pigment comprising: a) preparing an aqueous slurry of titanium dioxide; b) adding a polyprotic acid to the slurry, and c) adding an amine, alcohol, and/or alkanol amine during micronization of the pigment, wherein the mole ratio of amine, alcohol, and/or alkanol amine to the polyprotic acid is greater than 3:1.

20. A method of making titanium dioxide pigment comprising: a) preparing an aqueous slurry of titanium dioxide; b) adding an amine, alcohol, and/or alkanol amine a polyprotic acid to the slurry before wet treatment, and c) adding a polyprotic acid during micronization of the pigment, wherein the polyprotic acid contains substantially no carboxylic acid, and wherein the mole ratio of amine, alcohol, and/or alkanol amine to the polyprotic acid is greater than 3:1.

* * * * *

UNITED STATES PATENT AND TRADEMARK OFFICE
CERTIFICATE OF CORRECTION

PATENT NO. : 7,763,111 B2  Page 1 of 1
APPLICATION NO. : 11/778862
DATED : July 27, 2010
INVENTOR(S) : Modasser El-Shoubary et al.

It is certified that error appears in the above-identified patent and that said Letters Patent is hereby corrected as shown below:

Column 9, line 35: After "76.5% Solids Calculation:" insert $$\text{cc's} = \frac{\text{\% active dispersant on TiO}_2 \text{ wt. per increment} \times 600}{S \times Sp.G \times 100}$$

Signed and Sealed this

Twenty-third Day of November, 2010

David J. Kappos
*Director of the United States Patent and Trademark Office*

(12) EX PARTE REEXAMINATION CERTIFICATE (10502nd)
United States Patent
El-Shoubary et al.

(10) Number: US 7,763,111 C1
(45) Certificate Issued: Feb. 13, 2015

(54) COMPOSITIONS AND METHODS COMPRISING PIGMENTS AND POLYPROTIC DISPERSING AGENTS

(75) Inventors: Modasser El-Shoubary, Crofton, MD (US); Robert M. Hopkins, Reisterstown, MD (US); Karen L. Bowen, Pasadena, MD (US); David E. Bell, Glen Burnic, MD (US)

(73) Assignee: Cristal USA Inc., Hunt Valley, MD (US)

Reexamination Request:
No. 90/013,327, Aug. 29, 2014

Reexamination Certificate for:
Patent No.: 7,763,111
Issued: Jul. 27, 2010
Appl. No.: 11/778,862
Filed: Jul. 17, 2007

Certificate of Correction issued Nov. 23, 2010

Related U.S. Application Data

(62) Division of application No. 10/996,718, filed on Nov. 24, 2004, now Pat. No. 7,261,770.

(51) Int. Cl.
*C09C 1/36* (2006.01)
*C09C 1/04* (2006.01)
*C09C 3/00* (2006.01)
*C09C 3/08* (2006.01)

(52) U.S. Cl.
CPC ............ *C09C 1/3661* (2013.01); *C09C 1/3669* (2013.01); *C09C 1/3692* (2013.01); *C09C 3/006* (2013.01); *C09C 3/08* (2013.01); *C01P 2006/22* (2013.01); *C01P 2006/64* (2013.01); *C01P 2006/62* (2013.01); *C01P 2006/63* (2013.01); *C01P 2006/60* (2013.01)
USPC ............ 106/448; 106/428; 106/430; 106/436

(58) Field of Classification Search
None
See application file for complete search history.

(56) References Cited

To view the complete listing of prior art documents cited during the proceeding for Reexamination Control Number 90/013,327, please refer to the USPTO's public Patent Application Information Retrieval (PAIR) system under the Display References tab.

*Primary Examiner* — Sean E Vincent

(57) ABSTRACT

In various embodiments, a pigment composition is provided comprising a base particle and a dispersing agent, the dispersing agent comprising a salt and/or ester of: (i) an amine, alcohol, and/or alkanol amine and (ii) a polyprotic acid, wherein the mole ratio of the amine, alcohol, and/or alkanol amine to the polyprotic acid is greater than 3:1. In various embodiments, the pigments have improved stability, hiding power, tint strength, and/or gloss.

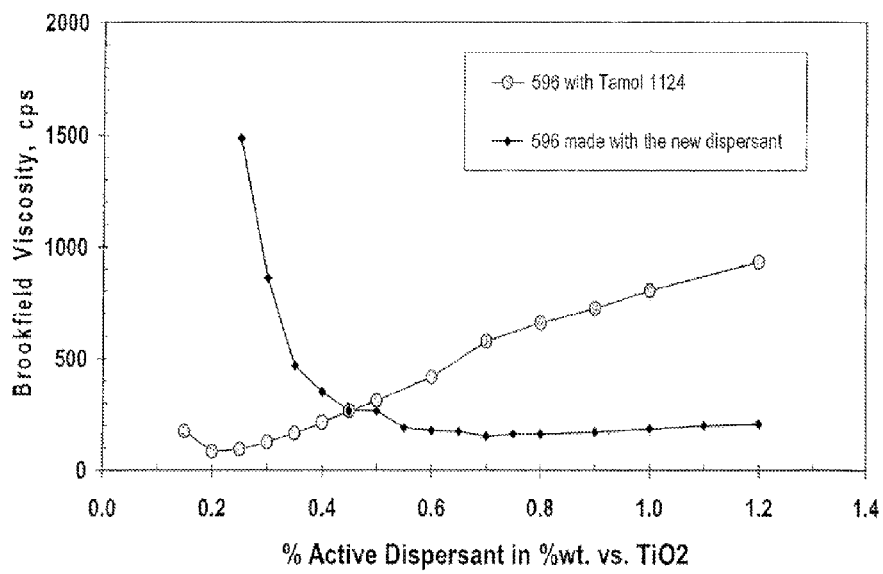

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-20 are determined to be patentable as amended.

New claims 21-39 are added and determined to be patentable.

1. A method of making *an aqueous* titanium dioxide pigment *slurry* comprising *forming a dispersing agent by* adding a polyprotic acid *having 3 or more protic groups* to an [amine, alcohol, and/or] alkanol amine *to form a salt*; wherein the mole ratio of [amine, alcohol, and/or] alkanol amine to polyprotic acid is greater than 3:1, [to form a dispersing agent having] *wherein said dispersing agent has* a mole ratio of [amine, alcohol, and/or] alkanol amine to polyprotic acid of greater than 3:1; and adding titanium dioxide to the dispersing agent *and water* to make the titanium dioxide pigment slurry, wherein the titanium dioxide has a particle size range of between about 0.1 and about 1 micron.

2. A method of making *an aqueous* titanium dioxide pigment *slurry* according to claim 1, wherein the pigment has improved stability, gloss, hiding power, tint strength or a combination thereof.

3. A method of making *an aqueous* titanium dioxide pigment *slurry* according to claim 1, wherein the polyprotic acid comprises phosphoric acid, polyphosphoric acid, [phosphonic acid,] metaphosphoric acid, [phosphinic acid,] pyrophosphoric acid, hypophosphoric acid, [phosphorous pentaoxide,] other phosphorus acid derivatives, or any other phosphorous containing acids or combinations thereof and the [amine or alcohol or] alkanol amine comprises at least one amino alcohol, [diol,] aminopolyol, [polyol, primary amine, secondary amine, tertiary amine] or combination thereof.

4. A method of making *an aqueous* titanium dioxide pigment *slurry* according to claim 3, wherein the [amine, alcohol, and/or] alkanol amine comprises triethanolamine, 2-amino-2-methyl-1 propanol, 1-amino-1-butanol, 1-amino-2-propanol 2-amino-2-methyl-1,3-propanediol, 2-amino-2-ethyl-1,3-propanediol, 2-amino-2-hydroxymethyll-1,3-propanediol, [methanol, iso-propyl alcohol, butanol, methoxypropanol, trimethylole-thane, trimethylolpropane, pentaerythritol, ethylene glycol, propylene glycol,] or combination thereof.

5. A method of making *an aqueous* titanium dioxide pigment *slurry* according to claim 1, wherein the dispersing agent comprises from about 0.01 percent to about 5 percent by weight based on the weight of titanium dioxide.

6. A method of making *an aqueous* titanium dioxide pigment *slurry* according to claim 1, wherein the titanium dioxide is treated with silica, zirconia, alumina, or combination thereof.

7. A method of making *an aqueous* titanium dioxide pigment *slurry* according to claim 1, wherein the mole ratio of the [amine, alcohol and/or] alkanol amine to the polyprotic acid is from 4:1 to about 20:1.

8. A method of making *an aqueous* titanium dioxide pigment *slurry* comprising *forming a dispersing agent by* adding a polyprotic acid *having 3 or more protic groups* to an [amine, alcohol, and/or] alkanol amine *to form a salt*; wherein the polyprotic acid contains substantially no carboxylic acid, and wherein the mole ratio of [amine, alcohol, and/or] alkanol amine to polyprotic acid is greater than 3:1, [to form a dispersing agent having] *wherein said dispersing agent has* a mole ratio of [amine, alcohol, and/or] alkanol amine to polyprotic acid of greater than 3:1; and adding titanium dioxide to the dispersing agent *and water* to make the *aqueous* titanium dioxide pigment *slurry*.

9. A method of making *an aqueous* titanium dioxide pigment *slurry* according to claim 8, wherein the polyprotic acid comprises phosphoric acid, polyphosphoric acid, [phosphonic acid,] metaphosphoric acid, [phosphinic acid,] pyrophosphoric acid, hypophosphoric acid, [phosphorous pentaoxide,] other phosphorus acid derivatives, or any other phosphorous containing acids or combinations thereof and the [amine or alcohol or] alkanol amine comprises at least one amino alcohol, [diol,] aminopolyol, [polyol, primary amine, secondary amine, tertiary amine] or combination there.

10. A method of making *an aqueous* titanium dioxide pigment *slurry* according to claim 9, wherein the [amine, alcohol, and/or] alkanol amine comprises triethanolamine, 2-amino-2-methyl-1 propanol, 1-amino-1-butanol, 1-amino-2-propanol, 2-amino-2-methyl-1,3-propanediol, 2-amino-2-ethyl-1,3-propanediol, 2-amino-2-hydroxymethyll-1,3-propanediol, [methanol, isopropyl alcohol, butanol, methoxypropanol, trimethylolethane, trimethylolpropane, pentaerythritol, ethylene glycol, propylene glycol,] or combination thereof.

11. A method of making *an aqueous* titanium dioxide pigment *slurry* according to claim 8, wherein the dispersing agent comprises from about 0.01 percent to about 5 percent by weight based on the weight of titanium dioxide.

12. A method of making *an aqueous* titanium dioxide pigment *slurry* according to claim 8, wherein the titanium dioxide is treated with silica, zirconia, alumina, or combination thereof.

13. A method of making *an aqueous* titanium dioxide pigment *slurry* according to claim 8, wherein the mole ratio of the [amine, alcohol and/or] alkanol amine to the polyprotic acid is from 4:1 to about 20:1.

14. A method of making *an aqueous* titanium dioxide pigment *slurry* comprising: a) preparing an aqueous slurry of titanium dioxide; b) adding in any order: (i) a polyprotic acid *having 3 or more protic groups* that contains substantially no carboxylic acid to the slurry, ii) an [amine, alcohol, and/or] alkanol amine to the slurry, wherein *said alkanol amine and said polyprotic acid form a salt and* the mole ratio of [amine, alcohol, and/or] alkanol amine to the polyprotic acid is greater than 3:1.

15. A method of making *an aqueous* titanium dioxide pigment *slurry* according to claim 14, wherein the polyprotic acid is added to the slurry before wet treatment and the [amine, alcohol, and/or] alkanol amine is added during micronization of the pigment.

16. A method of making *an aqueous* titanium dioxide pigment *slurry* according to claim 14, wherein the polyprotic acid and the [amine, alcohol, and/or] alkanol amine is added to the titanium dioxide prior to wet treating, filtering, drying or micronizing the titanium dioxide.

17. A method of making *an aqueous* titanium dioxide pigment *slurry* according to claim 14, wherein the polyprotic acid and the [amine, alcohol, and/or] alkanol amine are added to the titanium dioxide pigment as a mixture.

18. A method of making *an aqueous* titanium dioxide pigment *slurry* according to claim 14, wherein the polyprotic acid and the [amine, alcohol, and/or] alkanol amine are added to the titanium dioxide pigment separately.

19. A method of making *an aqueous* titanium dioxide pigment *slurry* comprising: a) preparing an aqueous slurry of titanium dioxide; b) adding a polyprotic acid *having 3 or more protic groups* to the slurry, and c) adding an [amine, alcohol, and/or] alkanol amine during micronization of the pigment, wherein *said alkanol amine and said polyprotic acid form a salt and* the mole ratio of [amine, alcohol, and/or] alkanol amine to the polyprotic acid is greater than 3:1.

20. A method of making *an aqueous* titanium dioxide pigment *slurry* comprising: a) preparing an aqueous slurry of titanium dioxide; b) adding an [amine, alcohol, and/or] alkanol amine [a polyprotic acid] to the slurry before wet treatment, and c) adding a polyprotic acid *having 3 or more protic groups* during micronization of the pigment, wherein the polyprotic acid contains substantially no carboxylic acid, and wherein *said alkanol amine and said polyprotic acid form a salt and* the mole ratio of [amine, alcohol, and/or] alkanol amine to the polyprotic acid is greater than 3:1.

21. *A method of making an aqueous titanium dioxide pigment slurry comprising adding an alkanol amine to an aqueous slurry comprising solid titanium dioxide particles and a polyprotic acid having 3 or more protic groups that contains substantially no carboxylic acid, the mole ratio of alkanol amine to polyprotic acid being greater than 3:1, wherein said alkanol amine and said polyprotic acid form a salt.*

22. *A method of making an aqueous titanium dioxide pigment slurry according to claim 14, wherein said pigment slurry is thixotropic such that sedimentation is readily fluidized upon sparging and said pigment slurry is pumpable.*

23. *A method of making an aqueous titanium dioxide pigment slurry according to claim 14, wherein said pigment slurry comprises from about 40% to about 85% by weight solid titanium dioxide.*

24. *A method of making an aqueous titanium dioxide pigment slurry according to claim 14, wherein said polyprotic acid comprises 3 protic groups.*

25. *A method of making an aqueous titanium dioxide pigment slurry according to claim 14, wherein the mole ratio of the alkanol amine to the polyprotic acid is from 3:1 to about 20:1.*

26. *A method of making an aqueous titanium dioxide pigment slurry according to claim 14, wherein the mole ratio of the alkanol amine to the polyprotic acid is from 4:1 to about 20:1.*

27. *A method of making an aqueous titanium dioxide pigment slurry according to claim 14, wherein the titanium dioxide has a particle size range of between about 0.1 and about 1 micron.*

28. *A method of making an aqueous titanium dioxide pigment slurry according to claim 14, wherein the alkanol amine comprises 2-amino-2-methyl-1-propanol.*

29. *A method of making an aqueous titanium dioxide pigment slurry according to claim 14, wherein the alkanol amine comprises triethanolamine.*

30. *A method of making an aqueous titanium dioxide pigment slurry according to claim 14, wherein the alkanol amine comprises diethanolamine.*

31. *A method of making an aqueous titanium dioxide pigment slurry according to claim 21, wherein said pigment slurry is thixotropic such that sedimentation is readily fluidized upon sparging and said pigment slurry is pumpable.*

32. *A method of making an aqueous titanium dioxide pigment slurry according to claim 21, wherein said pigment slurry comprises from about 40% to about 85% by weight solid titanium dioxide.*

33. *A method of making an aqueous titanium dioxide pigment slurry according to claim 21, wherein said polyprotic acid comprises 3 protic groups.*

34. *A method of making an aqueous titanium dioxide pigment slurry according to claim 21, wherein the mole ratio of the alkanol amine to the polyprotic acid is from 3:1 to about 20:1.*

35. *A method of making an aqueous titanium dioxide pigment slurry according to claim 21, wherein the mole ratio of the alkanol amine to the polyprotic acid is from 4:1 to about 20:1.*

36. *A method of making an aqueous titanium dioxide pigment slurry according to claim 21, wherein the titanium dioxide has a particle size range of between about 0.1 and about 1 micron.*

37. *A method of making an aqueous titanium dioxide pigment slurry according to claim 21, wherein the alkanol amine comprises 2-amino-2-methyl-1-propanol.*

38. *A method of making an aqueous titanium dioxide pigment slurry according to claim 21, wherein the alkanol amine comprises triethanolamine.*

39. *A method of making an aqueous titanium dioxide pigment slurry according to claim 21, wherein the alkanol amine comprises diethanolamine.*

\* \* \* \* \*